UNITED STATES PATENT OFFICE.

COULTER W. JONES, OF MIDLAND, MICHIGAN, ASSIGNOR TO THE DOW CHEMICAL COMPANY, OF MIDLAND, MICHIGAN, A CORPORATION OF MICHIGAN.

METHOD OF ABSORBING HALOGENS.

1,386,117.     Specification of Letters Patent.     Patented Aug. 2, 1921.

No Drawing.     Application filed July 23, 1918. Serial No. 246,312.

*To all whom it may concern:*

Be it known that I, COULTER W. JONES, a citizen of the United States, and a resident of Midland, county of Midland, and State of Michigan, have invented a new and useful Improvement in Methods of Absorbing Halogens, of which the following is a specification, the principle of the invention being herein explained and the best mode in which I have contemplated applying that principle, so as to distinguish it from other inventions.

The usual method recommended for the separation of chlorin and bromin gas, or in other words, for the purification of bromin from an admixture of chlorin, is by the use of iron bromid to absorb such chlorin. In practice, iron in the form of wire or borings is placed with water in a suitable container or in a tower through which the mixture of gases with water is passed so as to allow such gases to come in contact therewith and form iron bromid solution; the latter then reacts with the chlorin, with formation of iron chlorid, and some iron chlorid moreover is formed directly. The solution, however, containing the iron bromid can be used to purify the gas until all the bromin in such solution has been replaced by chlorin. In this old method of purification and separation of bromin and chlorin, the resulting oxidation value of the chlorin cannot be utilized, so that oxidizing capacity to a corresponding extent is wasted.

The object of the present invention is to provide a new and useful process for the absorption and separation of a mixture of free halogens wherein the oxidation equivalent of the halogen absorbed is simultaneously utilized. In other words, the absorption of the mixture of free halogens is carried out in such a manner as to utilize the full oxidation capacity of the same to form tri- (or tetra in the case of iodin) oxygen haloid salts and to simultaneously purify or separate out one of them from the other.

To the accomplishment of the foregoing and related ends, the invention then consists of the steps hereinafter fully described and particularly pointed out in the claims, the following description setting forth in detail certain steps embodying the invention, such described steps constituting, however, but one of various ways in which the principle of the invention may be used.

My present improved process makes use of the familiar reaction which results when a halogen is absorbed by an alkali, haloid and tri-oxygen haloid salts being formed as follows:—

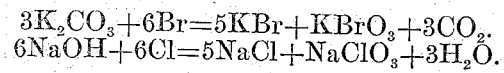
$$3K_2CO_3 + 6Br = 5KBr + KBrO_3 + 3CO_2.$$
$$6NaOH + 6Cl = 5NaCl + NaClO_3 + 3H_2O.$$

In the foregoing reactions the mono-oxygen haloid salt is first formed but this salt is in most cases unstable at ordinary temperatures, forming when slightly heated the tri-oxygen salt as represented by the following equation:—

$$3NaOCl = 2NaCl + NaClO_3.$$

Now, the oxidation power or activity of the halogens is inversely proportional to their atomic weights. Thus, chlorin will oxidize bromin in an alkaline solution to a bromate, the chlorid being formed from the reacting chlorin as represented by the equation:—

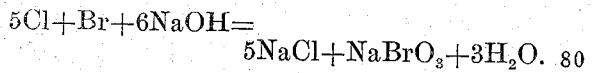
$$5Cl + Br + 6NaOH = 5NaCl + NaBrO_3 + 3H_2O.$$

Similarly, chlorin will oxidize iodin to an iodate in an acid solution and to a per-iodate in an alkaline solution, while bromin will oxidize iodin to an iodate in an alkaline solution. In carrying out my present improved process, sufficient alkaline solution (sodium hydroxid or sodium carbonate, for example), is placed in a tower or in a container adjacent to the tower, through which the mixture of halogen gases, *e. g.* bromin and chlorin, is passed, and such alkaline solution is pumped over the tower in order to insure a thorough contact between the same and such gases. Sufficient alkali is added from time to time to remove all chlorin from the gas and in addition provide for the absorption of one molecule of bromin to five of chlorin, as represented by the following equation:—

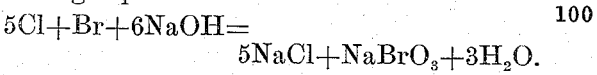
$$5Cl + Br + 6NaOH = 5NaCl + NaBrO_3 + 3H_2O.$$

Where the process is used in the purification of a mixture where the bromin is in excess of one of bromin to five of chlorin, the residual bromin simply passes on unchanged, but free of course from chlorin, as illustrated in the following reaction:—

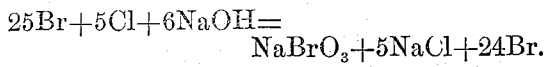
$$25Br + 5Cl + 6NaOH = NaBrO_3 + 5NaCl + 24Br.$$

The residual bromin thus purified may then be absorbed in any well known manner, while the bromate may be readily separated from the chlorid by fractional crystallization due to their difference in solubility, or the oxidation represented by the bromate may be used without separating it from the chlorid by using the mixture directly, for example, in the manufacture of liquid bromin in accordance with the following reaction in which the chlorid takes no part and does not interfere, viz:—

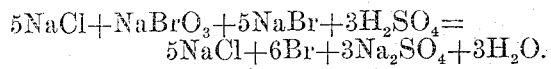
$$5NaCl + NaBrO_3 + 5NaBr + 3H_2SO_4 = 5NaCl + 6Br + 3Na_2SO_4 + 3H_2O.$$

The present process is just as applicable to the purification of liquid bromin as to the recovery of gaseous bromin from an admixture of chlorin. Sufficient alkaline solution is agitated with the liquid bromin to remove all the chlorin and the proportionate amount of bromin represented by the foregoing formulas.

Other methods of applying the principle of my invention may be employed instead of the one explained, change being made as regards the process herein disclosed, provided the step or steps stated by any one of the following claims or the equivalent of such step or steps be employed.

I therefore particularly point out and distinctly claim as my invention:—

1. The method of recovering bromin from an admixture of chlorin, which consists in treating the same with sufficient alkali to absorb such chlorin and one molecule of bromin to five of chlorin, thereby converting such chlorin into chlorid and forming a proportionate amount of bromate, separating such bromate from such chlorid, and subsequently absorbing the residual bromin purified as aforesaid by elimination of the chlorin.

2. The method of recovering bromin from an admixture of chlorin, both in gaseous form, which consists in treating the same with sufficient alkali metal carbonate to absorb such chlorin and one molecule of bromin to five of chlorin, thereby converting such chlorin into sodium chlorid and forming a proportionate amount of sodium bromate, then separating such chlorid and bromate by fractional crystallization, and subsequently absorbing the residual bromin purified as aforesaid by elimination of the chlorin.

Signed by me, this 18th day of July, 1918.

COULTER W. JONES.